April 14, 1942.  R. S. BOHANNAN  2,279,912
HYDRAULIC FORCE TRANSMISSION FOR WEIGHING SCALES
Filed Oct. 17, 1939  3 Sheets-Sheet 1
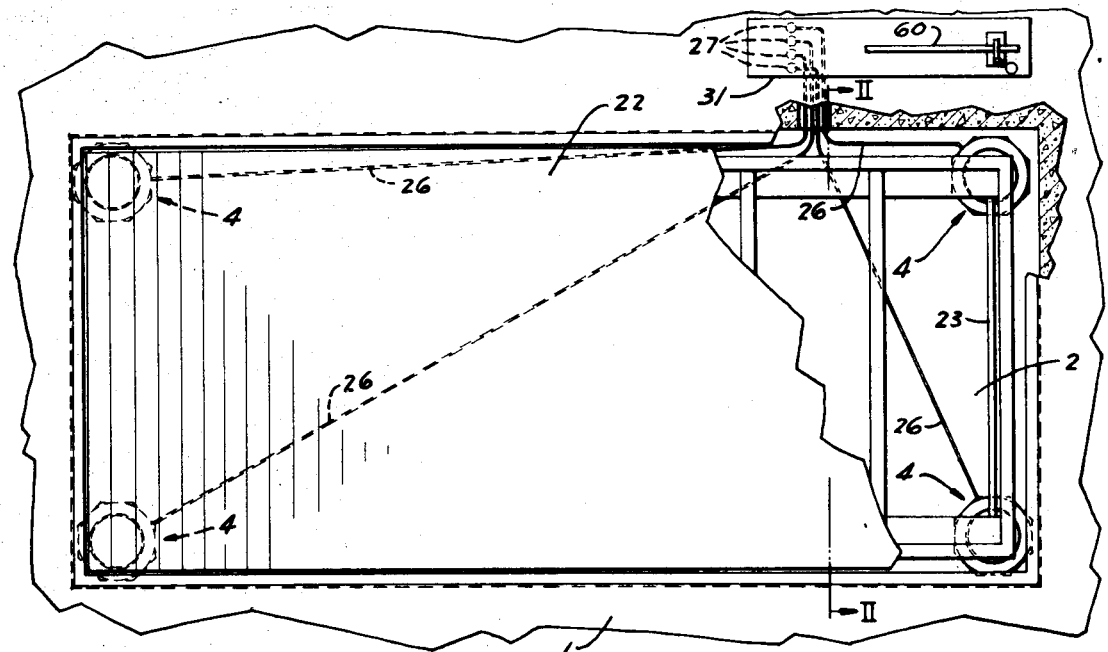
Fig. I
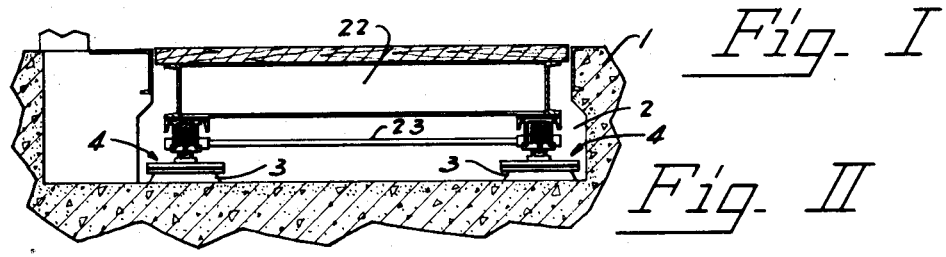
Fig. II
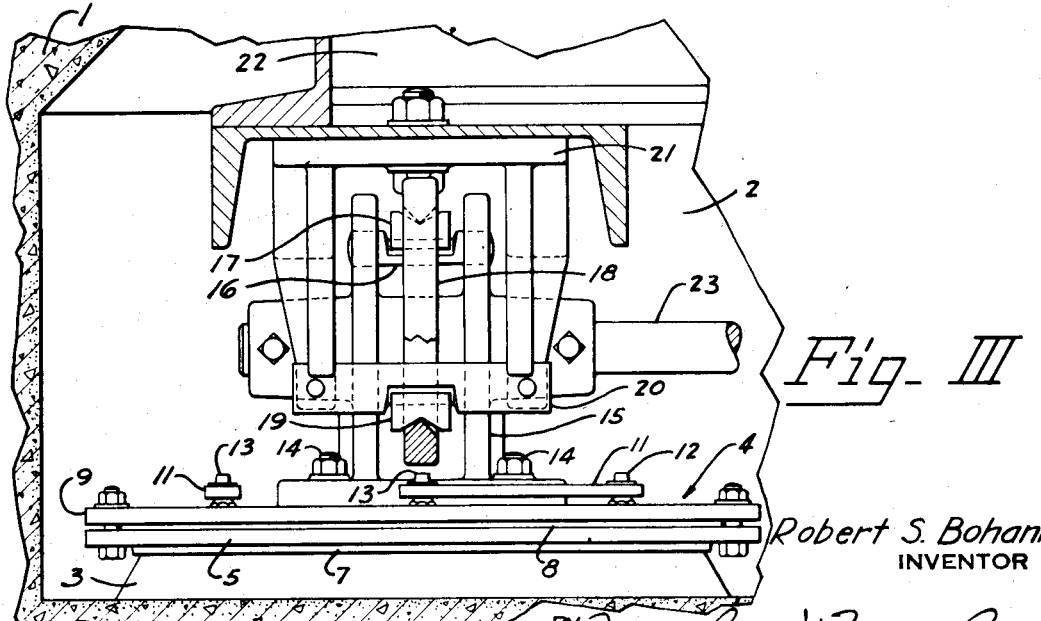
Fig. III
Robert S. Bohannan
INVENTOR
BY Marshall & Marshall
ATTORNEYS

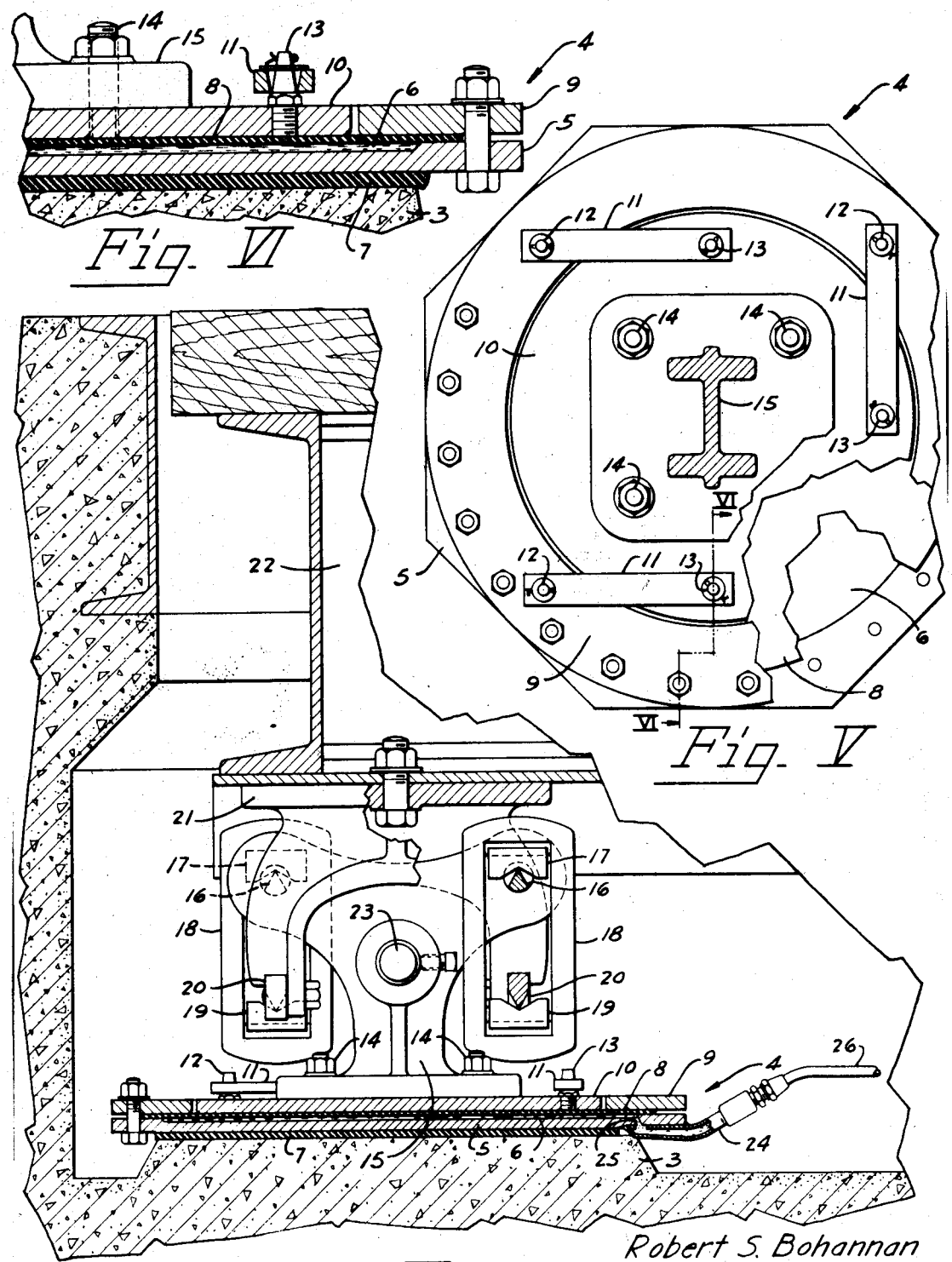

April 14, 1942.  R. S. BOHANNAN  2,279,912
HYDRAULIC FORCE TRANSMISSION FOR WEIGHING SCALES
Filed Oct. 17, 1939   3 Sheets-Sheet 3
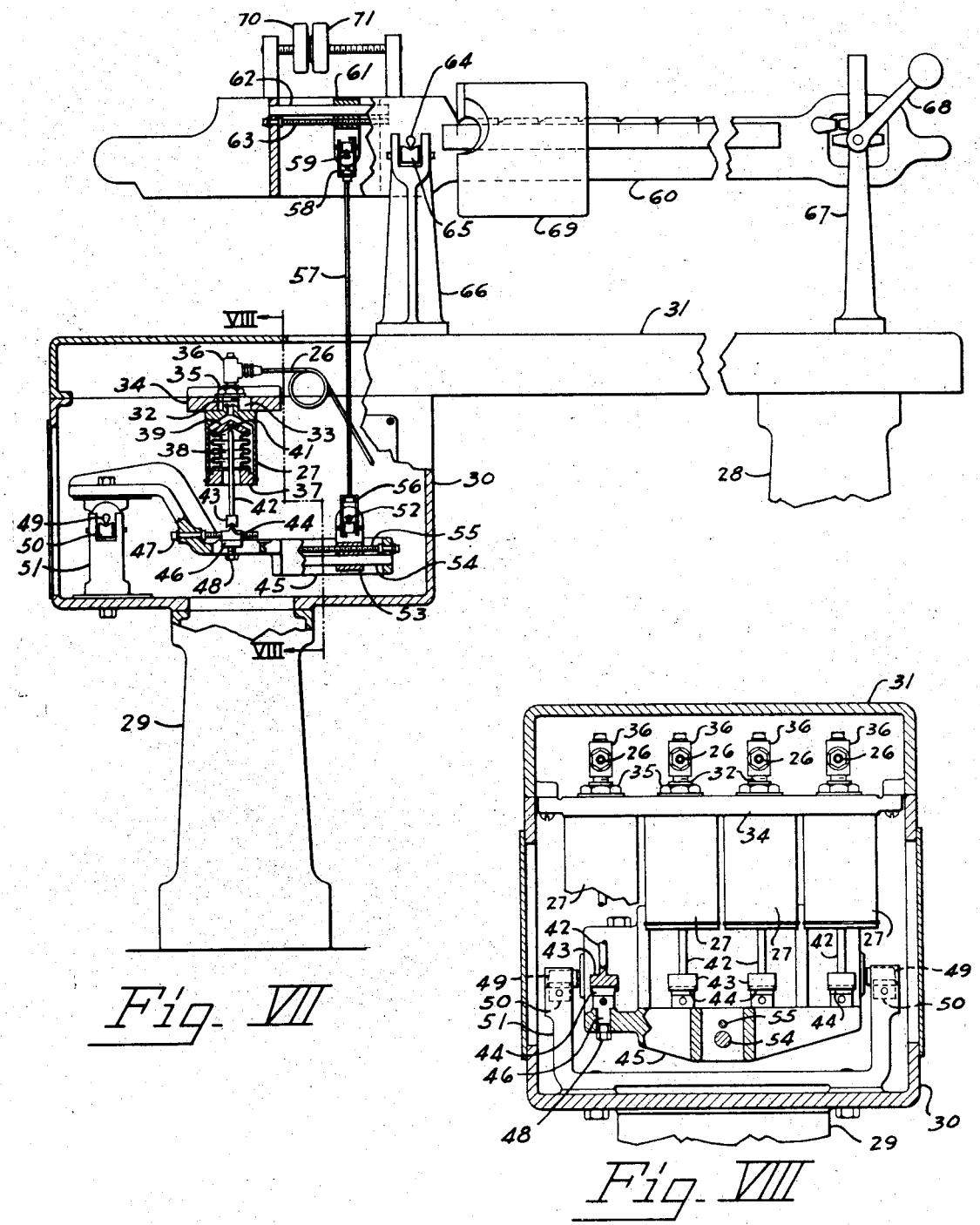
Fig. VII
Fig. VIII
Robert S. Bohannan
INVENTOR
BY Marshall & Marshall
ATTORNEYS Patented Apr. 14, 1942

2,279,912

UNITED STATES PATENT OFFICE 2,279,912

HYDRAULIC FORCE TRANSMISSION FOR WEIGHING SCALES

Robert S. Bohannan, Toledo, Ohio, assignor to Toledo Scale Company, Toledo, Ohio, a corporation of New Jersey Application October 17, 1939, Serial No. 299,831

5 Claims. (Cl. 265—47)

This invention relates to hydraulic force transmissions for weighing scales of the general type illustrated and described in my copending application for United States Letters Patent Ser. No. 222,831, filed August 3, 1938.

It is an object of this invention to improve the construction of capsules which support the weighbridges of such scales.

Another object is to provide means for so supporting weighbridges upon such capsules that the weighbridges may yield or swing when trucks are driven upon them.

Another object is to provide supporting means which will permit such swinging of weighbridges but will nevertheless maintain the condition of level of pressure transmitting diaphragm disks which form parts of such capsules.

Another object is to provide means for supporting weighbridges from hydraulic capsules which will prevent cocking or rocking of such diaphragm disks but nevertheless will permit horizontal movements of the weighbridges without subjecting the diaphragms upon which such disks are supported to destructive strains.

And still another object is the provision of means for supporting weighbridges from diaphragms which will permit horizontal movements of such weighbridges but will always restore such weighbridges to their original positions.

Other objects and advantages will be apparent from the following description, in which reference is had to the accompanying drawings illustrating a preferred embodiment of my invention and wherein similar reference numerals designate similar parts throughout the several views.

In the drawings:

Fig. I is a plan view, with parts broken away and parts in section, of a weighing scale embodying my invention.

Fig. II is a view in section taken as indicated by the line II—II of Fig. I, parts being broken away.

Fig. III is an enlarged fragmentary and elevational view showing mechanism employed for supporting one corner of a weighbridge, parts being in section.

Fig. IV is a similarly enlarged fragmentary side elevational view showing such mechanism, parts being in section.

Fig. V is a plan view of a capsule and stand of the invention, parts being broken away and parts in section.

Fig. VI is a further enlarged fragmentary sectional view taken as indicated by the line VI—VI of Fig. V.

Fig. VII is a front elevational view showing the head of the scale, parts being broken away and parts in section; and Fig. VIII is an enlarged sectional view taken as indicated by the line VIII—VIII of Fig. VII.

The scale is erected upon a concrete foundation 1 containing a pit 2, at the corners of which are short, flat topped piers 3. Surmounting each of the piers 3 is a capsule 4, each capsule having a lower plate 5 with a plane bottom and a shallow depression 6 formed in its upper side. A pressure equalizing mat 7 of yieldable material is interposed between the upper flat surface of each pier and the bottom of the plate 5 of the surmounting capsule.

Covering the depression 6 of each plate 5 is a diaphragm 8 of yieldable material, such as sheet packing, the diaphragm being clamped upon the plate 5 by means of a clamping ring 9.

Overlying the central portion of the diaphragm and within the central opening of the ring 9 is a disk 10 whose diameter is slightly less than that of the ring opening. The disk 10 is positioned centrally of the ring opening by check links 11 having tapered orifices which engage over shouldered studs 12 that are screwed into the ring 9 and shouldered studs 13 that are screwed into the disk 10.

Secured upon each of the disks 10, by means of fastenings 14, is a stand 15 composed of two T-shaped portions and having a pair of knife edge pivots 16 extending between the upper crosspieces of the T-shaped portions. Resting upon the pivots 16 are bearing blocks 17, each of which has a downturned V-groove engaging a pivot 16 and an upturned V-groove engaging a knife edge formed in the upper end of a link 18.

The lower ends of the links 18 also have knife edges formed therein, and bearing blocks 19, similar in form to the bearing blocks 17, rest upon the knife edges in the lower ends of the links and support pivot bars 20 which are secured to legs extending downwardly from brackets 21 secured beneath the steel framework of a weighbridge 22.

Crossbars 23 extend between the stands 15 at each end of the weighbridge and prevent either of them from tilting sidewise, while the fact that the pivot bars 20 are all rigidly secured to the frame of the weighbridge and that their knife edges are thus held in a horizontal plane, and the fact that the pivots 16 on the stands 15 are connected to the pivot bars 20 by parallel links, insures that the knife edges of the pivots 16 will remain in a horizontal plane, and therefore that the stands 15 cannot tilt endwise of the weighbridge. The disks 10 thus are prevented from getting out of level during swinging movement of the weighbridge.

Brazed to the plate 5 is a short length of tubing 24 having one end closed and the other end open, and a channel 25 leads from the interior of the tubing 24 to the interior of the capsule 4. Long lengths of tubing 26 are connected to the short lengths 24 and lead respectively to chambers 27 which are mounted upon the frame of the scale head (see Figs. VII and VIII).

The framework of the scale head comprises two columns 28 and 29, the column 29 being surmounted by a cabinet 30, and the cabinet 30 and the column 28 being connected by a shelf 31 extending over their tops. Each of the chambers 27 is provided with a nipple 32 which extends upwardly through a slot 33 in a crosspiece 34 mounted within the cabinet 30, and nuts 35 threaded upon the nipples serve to clamp the chambers to the crosspiece.

The long lengths of tubing 26 are connected, by means of fittings 36, to the upper ends of the nipples. Thus there is a conduit from the interior of each of the capsules 4 to the interior of one of the chambers 27.

Secured within the lower end of each chamber 27 by means of a threaded and liquid-tight joint is an annulus 37 to the upper face of which is brazed or otherwise non-leakably connected the lower edge of a metallic bellows 38, the open end of the bellows being thus sealed within the lower open end of the chamber. Brazed or otherwise non-leakably secured to the upper edge of the metallic bellows 38 is a disk 39 within which is fixed a hard bearing 41 preferably having a conical seat in its lower side. Seated in the conical seat of the bearing 41 is the pointed upper end of a push rod 42 having a bearing 43 at its lower end which is seated upon a knife edge pivot 44.

All of the pivots 44 are mounted upon a shelf lever 45, each pivot 44 being fixed in a retainer 46 which may be adjusted longitudinally of the lever 45 by means of an adjusting screw 47. Each retainer 46 is provided with a locking screw 48 to fasten it in adjusted position.

Fulcrum pivots 49 are secured to the shelf lever 45 and rest upon V-groove bearings 50 which are supported by a bracket 51 mounted within the cabinet 30.

The shelf lever 45 is provided with a single nose pivot 52 mounted in a pivot retainer 53 which is slidably mounted on a bar 54 that is secured to and extends longitudinally of the shelf lever 45. The pivot retainer 53 may be adjusted along the bar 54 by means of an adjusting screw 55 and may be clamped in adjusted position.

Engaging the nose pivot 52 is a bearing that is carried by a stirrup 56 connected to the lower end of the pull rod 57, another stirrup 58 being connected to the upper end of the pull rod and carrying another bearing that engages a load pivot 59 of a beam lever 60.

The load pivot 59 is mounted in a pivot retainer 61 which is slidably mounted on a bar 62 that is secured to and extends longitudinally of the beam lever 60. The pivot retainer 61 may be adjusted along the bar 62 by means of an adjusting screw 63.

The beam lever 60 is supported by means of fulcrum pivots 64 upon bearings 65 mounted in a fulcrum stand 66. The free end of the beam swings within a trig loop 67 which is provided with a lock 68. The beam lever 60 is provided with a poise 69 which may be moved to various positions to counterbalance the weights of loads, and is also provided with small balancing weights 70 and 71 of well known form.

When a load is moved onto the weighbridge 22, the weight of the load is transmitted through the links 18 and the stands 15 of the disks 10 and diaphragms 8. Pressure is thus applied to the liquid contained within the capsules 4, the tubing 26 and the chambers 27. Pressure in the chambers 27 presses the disks 39 downwardly upon the push rods 42 to swing the shelf lever 45 and to pull downwardly on the pull rod 57. The downward pull is transmitted to the short arm of the beam 60 and is resisted by the counterbalancing effect of the poise 69 which is mounted on the long arm of the beam lever.

Each capsule 4 with the tubing 26 and chamber 27 connected thereto is a closed system at one end of which is the diaphragm disk 10, the disk 39 secured to the bellows 38 being at the other end of the closed system. Since the pressure of the liquid is exerted upon the exterior of the bellows 38, the bellows is capable of withstanding much greater pressure than it would be capable of withstanding if the pressure were exerted upon the interior of the bellows as is the case in the device illustrated and described in my copending application Ser. No. 222,831.

Where fluid pressure is exerted upon the interior of a bellows the bellows tends to elongate, and where such elongation is resisted by abutments against the ends the bellows is liable to buckle under extreme internal fluid pressure, since the volumetric content of the bellows is permitted to increase by buckling. In the arrangement illustrated and described in this application, any buckling of the metallic bellows 38 decreases the volumetric content of the chamber 27, i. e., buckling of the bellows 38 tends to force liquid out of the chamber 27. Hence, forcing liquid into the chamber cannot cause the bellows to buckle.

Since each capsule 4 with its connected tubing 26 and chamber 27 is a separate hydraulic system, the effect of a load on any corner of the weighbridge 22 may be varied by varying the point of application of the force applied to the hydraulic system supporting that corner of the weighbridge to the shelf lever 45. The point of application of the load to the shelf lever 45 may be varied by adjusting the position of the pivot 44. If the diaphragm disks 10 were all of exactly the same area and if the effective areas of the disks 39 were exactly alike, the knife edges of the pivots 44 would have to be aligned if the scale were to weigh correctly regardless of where the load was moved upon the weighbridge. If, however, one of the diaphragm disks 10 were slightly oversize so that the hydraulic pressure per unit of area in the system of which that diaphragm disk forms a part were slightly less for a given load, a slight adjustment of the pivot 44 connected to that hydraulic system would compensate for the excess area of the diaphragm.

Oversize of a diaphragm in a capsule 4 is compensated for by moving the connected pivot 44 away from the fulcrum pivot 49 of the shelf lever 45 while oversize of a bellows disk 39 is compensated for by moving the load pivot 44 toward the fulcrum pivot 49 of the shelf lever, and vice versa.

In order to restore proper angular condition of each of the push rods 42 after adjustment of the pivot receiving its thrust, the nut 35 is loosened and the chamber 27 is moved in the same direction as that in which the pivot 44 was moved and to approximately the same extent. The force exerted upon the bellows disk 39 is applied to the shelf lever 45 at a definite distance from the shelf lever fulcrum, and since the bearing 41 in the disk 39 is above the major portion of the upper disk surface, it is unnecessary to check the push rod 42.

It will be observed that while the diaphragm disks 10 are prevented from tilting, the weighbridge 22 is free to swing in any direction under the influence of horizontally acting forces such as occur when trucks are driven upon the weighbridge. As soon as the disturbing forces cease, the weighbridge, being supported upon freely swinging links, invariably swings back to its initial position, where it is free of interference with the sides of the pit. Such temporary horizontal strains as are transmitted to the diaphragm disks 10 are taken by the check links 11. It will be noted that the check links 11 are so arranged as to prevent not only radial shifting of the diaphragm disks but also rotational shifting thereof.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, a plurality of capsules adapted to contain liquid, each of said capsules having a diaphragm adapted to be pressed against such liquid, a standard so supported by each of said capsules as to exert pressure upon its diaphragm, means rigidly connecting certain of said standards to others of said standards to prevent separate tilting thereof, a load receiving structure, and means supporting said load receiving structure from said standards, said supporting means being yieldable to permit temporary horizontal shifting of said load receiving structure.

2. In a weighing scale, in combination, a plurality of capsules adapted to contain liquid, each of said capsules having a flexible diaphragm adapted to be pressed against such liquid, a member of definite area adapted to be pressed upon said diaphragm, a standard so supported by each of said capsules as to exert pressure upon said member of definite area, means rigidly connecting certain of said standards to others of said standards to prevent separate tilting thereof, a load receiving structure, and means supporting said load receiving structure from said standards, said supporting means being yieldable to permit temporary horizontal shifting of said load receiving structure and capable of returning said load receiving structure to its initial position upon cessation of forces causing such temporary shifting.

3. In a weighing scale, in combination, a plurality of capsules adapted to contain liquid, each of said capsules having a flexible diaphragm adapted to be pressed against such liquid, a diaphragm disk of definite area supported by each of said diaphragms, a standard erected upon each of said diaphragm disks, means rigidly connecting certain of said standards to others of said standards to prevent separate tilting thereof, a load receiving structure, and means supporting said load receiving structure from said standards, said supporting means being yieldable to permit temporary horizontal shifting of said load receiving structure.

4. In a weighing scale, in combination, a plurality of capsules adapted to contain liquid, each of said capsules having a diaphragm adapted to be pressed against such liquid, a standard so supported by each of said capsules as to exert pressure on said diaphragm, means rigidly connecting certain of said standards to others of said standards to prevent separate tilting thereof, links depending from said standards, and a rigid platform structure so supported by said links as to swing under the influence of horizontal forces.

5. In a weighing scale, in combination, a plurality of capsules adapted to contain liquid, each of said capsules having a diaphragm adapted to be pressed against such liquid, a diaphragm disk adapted to be pressed against each of said diaphragms, standards so supported by each of said capsules as to exert pressure on said diaphragm disks, means rigidly connecting certain of said standards in pairs to prevent separate tilting of the standards of such pairs, parallel links depending from said standards, a rigid load receiving structure, and means rigidly secured to said load receiving structure and supported by said parallel links whereby said pairs of standards are prevented from tilting and said load receiving structure is permitted to swing under the influence of horizontal forces.

ROBERT S. BOHANNAN.